Nov. 18, 1941.  E. M. WEBER  2,262,981
INTERNAL COMBUSTION ENGINE
Filed Aug. 30, 1938   3 Sheets-Sheet 1

Inventor,
E. M. Weber
By Glascock Downing & Seebold
Attys.

Nov. 18, 1941. E. M. WEBER 2,262,981
INTERNAL COMBUSTION ENGINE
Filed Aug. 30, 1938 3 Sheets-Sheet 2

Inventor,
E. M. Weber
By: Glascock Downing Seebold
Attys.

Nov. 18, 1941.  E. M. WEBER  2,262,981
INTERNAL COMBUSTION ENGINE
Filed Aug. 30, 1938  3 Sheets-Sheet 3

Inventor,
E. M. Weber
By: Glascock Downing Seebolt

Patented Nov. 18, 1941

2,262,981

UNITED STATES PATENT OFFICE 2,262,981

INTERNAL COMBUSTION ENGINE

Emile Michel Weber, Brussels, Belgium

Application August 30, 1938, Serial No. 227,575
In Belgium September 24, 1937

5 Claims. (Cl. 123—33)

The invention relates to internal combustion engines of the type in which the fuel is injected and ignited by compression although it is also applicable to electric ignition engines.

The engine according to the invention comprises a combustion chamber divided into several connected compartments the main compartment or compartments of which are above the piston and at least one of which is located outside the cylinder, the fuel being injected in liquid form in the various compartments by means of one or more injectors discharging directly into one or more of the said compartments and supplying to the latter quantities of fuel which are proportional to their respective volumes.

The system of fuel supply by which each of the compartments receives the proportional quantity of fuel which suits it, permits the combustion in the various spaces to be influenced with a maximum amount of precision and efficiency. Moreover, as the principal compartment or compartments of the combustion chamber are above the piston a large quantity of fluid acts directly on the latter. For these reasons high mean effective pressures are obtained. The latter do not give rise to maximum pressures which are too high, however, since the various compartments are arranged and connected in such a way that owing to the suitable whirling movements the ignition and combustion combine to give a very advantageous working cycle both from the point of view of the efficiency and the life of the machine.

Some examples of constructions of engines according to the invention will now be described with reference to the accompanying drawings in which.

Figure 1:
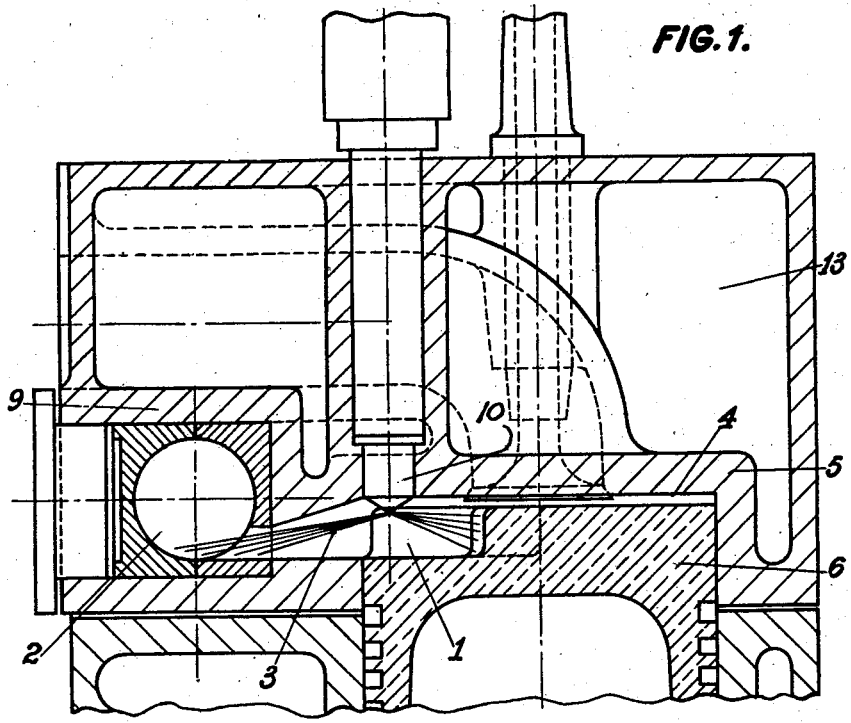
Figure 1 is a fragmentary view in section along the axis of the cylinder of an engine according to the invention.
Figure 2:
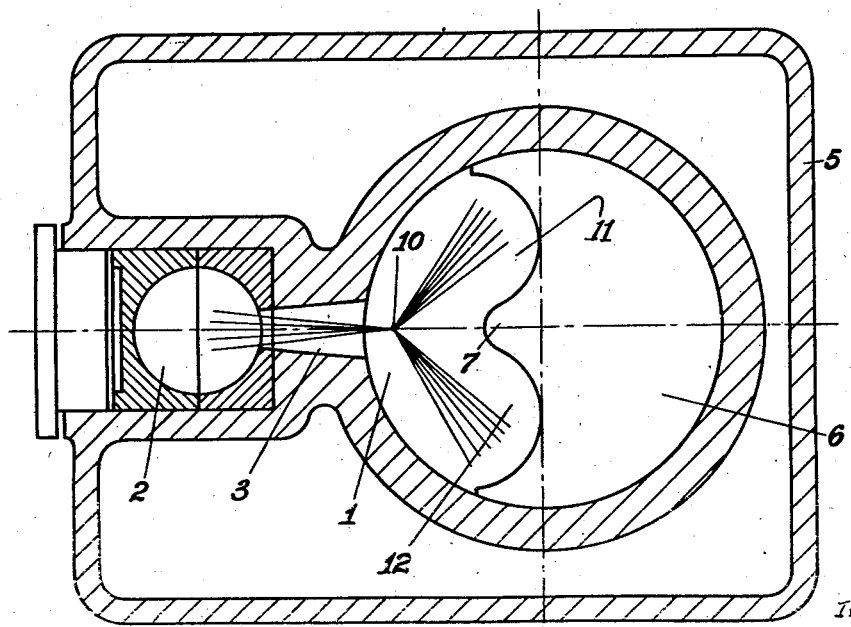
Figure 2 is a partial view of the engine in transverse section.

In the example shown in Figures 1 and 2 the combustion chamber comprises the principal compartment 1, an auxiliary compartment 2, a channel or passage 3 connecting the said two compartments, and a space 4 determined by the clearance space between the combustion head 5 and the piston 6 when the latter is at top dead centre. The compartment 2 preferably has the form of a sphere into which the channel 3 passes tangentially.

The chamber 1 can be formed by a recess in the piston, and as shown in Figure 2 it can advantageously be subdivided into two compartments 11 and 12 cut symmetrically in the piston and separated by a rib 7 located opposite the channel 3. This conformation of the chamber 1 gives rise to an effective turbulence. The chamber 1 can also be formed in the combustion head itself and in this case the piston head is entirely flat.

As shown in Figure 2 the injection of the fuel can, for example, be obtained in a simple and rational manner by means of a single injector 10 located near the periphery of the cylinder in immediate proximity to the channel 3, that is to say, discharging at the point at which the three principal compartments meet and supplying three jets two of which feed the compartments 11 and 12 while the third is directed into the compartment 2 through the channel 3. The quantities of fuel injected in the various compartments are proportional to the volumes of the said compartments. Thus in round figures, if the auxiliary sphere and its channel represent approximately one-third of the total volume of the combustion chamber and if the compartments 11 and 12 are of equal volume, each of the three jets supplied by the injector 10 should represent one-third of the total quantity of fuel injected per working cycle. The fuel can also be injected, for example, by means of an injector, such as 10a (Fig. 8), but having only two jets for feeding the compartments 11 and 12, while a second injector 9 discharges a suitable quantity of fuel into the auxiliary chamber 2. In any case owing to the direct injection of liquid fuel into all the principal compartments the fuel comes into contact with a maximum quantity of air which increases the efficiency of the machine, facilitates starting from cold, and ensures an intense ignition under all running conditions.

With this arrangement of the injector or injectors completely outside the area of the valves the latter can be made of large diameter and their seatings can be amply cooled, thus resulting in an excellent volumetric efficiency of the machine even at high speeds while at the same time the combustion head can be made very strong. In addition this arrangement makes it possible to use four valves which may be of a maximum diameter if desired, although this has been found impossible in other systems. Moreover, it is expedient to note that there is no injector in the channel 3. The latter is therefore not obstructed in any way and the injector is located outside the direct flow of gases.

Cooling can be effected by the usual means, for example by circulating water through the chamber 13. In the case of engines of the Diesel type the walls of the auxiliary chamber 2 are preferably not directly touched by the cooling fluid. In the case of electric ignition engines the channel or passage 3 can be directly cooled and can be provided with the electric ignition device.

Injection in the various compartments can be effected simultaneously or with a certain lag of one compartment relatively to the other. In any case the combined combustion in the various compartments gives rise to high mean effective pressures with moderate maximum pressures of the working cycle. In addition the ignition time is reduced on account of the fact that during the combustion the various compartments contain highly heated turbulent fluids.

The channel 3 is shaped so as to promote turbulence and its shape ensures, for example, that the fluids leaving the compartment 2 cause the desired whirling movements in the principal combustion chamber above the piston. The said channel can be of the form of a Venturi tube for example.

Figure 3:
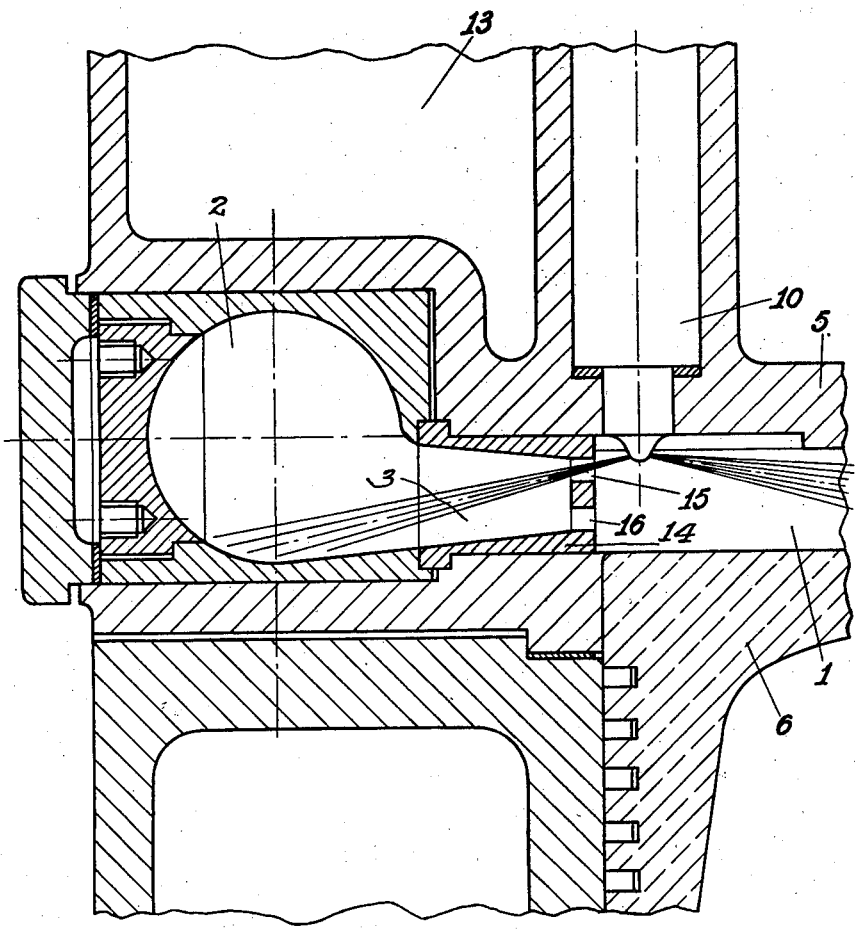
Figure 3 is an axial sectional view of another construction.
Figure 4:
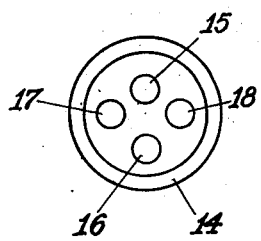
Figures 4 and 5 are elevations and Figure 6 is a section, of a device which can be arranged in the passage connecting the compartments of the combustion chamber.
Figure 5:
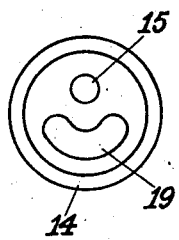
Figure 6:
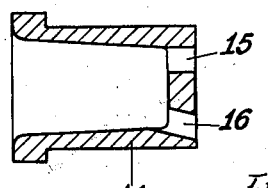
Figure 8:
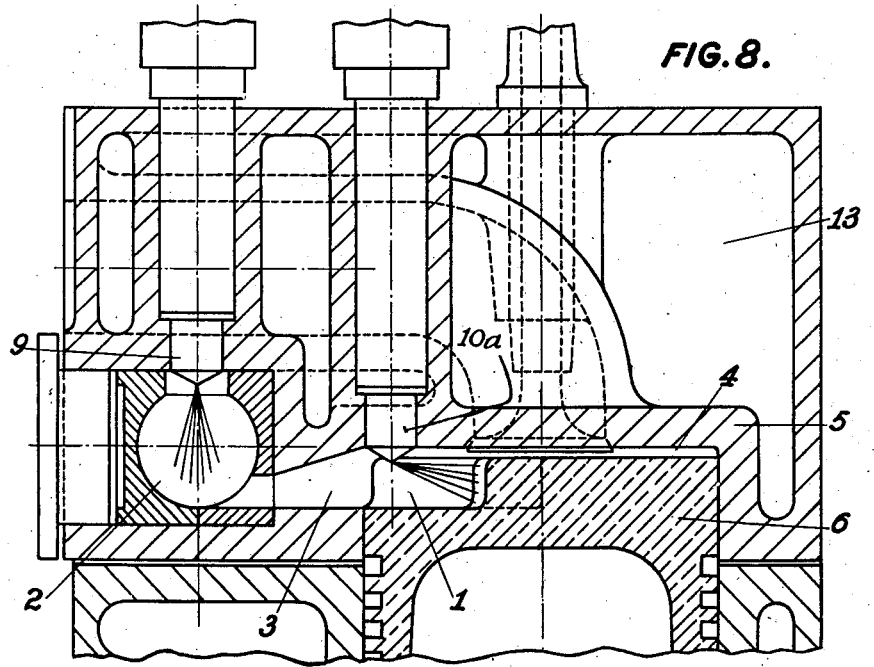

The channel 3 preferably has a narrowed section opening directly into the principal compartment 1. For example, there can be placed in the channel 3 as shown, for example, in Figure 3 a cup-shaped part 14, one end of which is located in immediate proximity to the chamber 1 and is provided with a port or hole 15. At the beginning of the power stroke fluids burning at a high temperature leave the auxiliary chamber. It is therefore advantageous to deviate the said fluids and to keep them away from the tip of the injector 10 to a large extent. Thus it is preferable to provide, in addition to the hole 15 for the jet of fluid, one or more passages 16, 17, 18 (Figure 4) or arc-shaped port 19 (Figure 5) intended to effect the deviation of the fluids. In this connection the hole 16 can be inclined downwards toward the compartment 1, for example, as shown in Figure 6 and in the same way the aperture 15 can be inclined upwards. The shape and dimensions of the said passages or holes are determined according to the shape and volume of the various compartments of the combustion chamber. The chamber 2 could even be brought close to the chamber 1 so that the said passages can be formed in the wall itself as shown in Figure 8.

It is expedient to note that the position of the smallest passage cross-section establishing the communication between the various compartments, and the subdivision of the said section, permit a better regulation of the dynamic actions which must be exerted in order to obtain in a rational manner the combined combustions which are produced in the various compartments.

Figure 7:
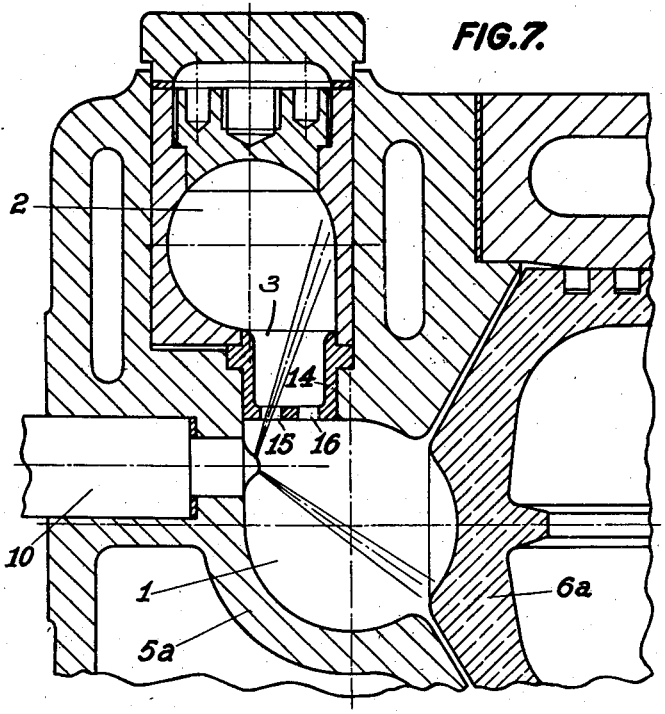
Figures 7 and 8 are fragmentary views in axial section of two other constructions of the engine according to the invention.

The construction shown in Figure 7 can be applied with advantage to two-stroke engines. The chamber 1 can consist of a spherical space formed partly in the piston 6a and partly in the combustion head 5a. A similar arrangement could be applied to four-stroke engines the spherical chambers being then located laterally outside the area of the valves, the chamber 5a being for example near the periphery of the piston. The single injector 10 can for example have two jets and if the spaces 2 and 3 comprise about one-third of the total volume of the combustion chamber the jet injected in the auxiliary chamber should form one-third of the total quantity of fuel injected per working cycle while the second jet will supply two-thirds of the said total quantity. Instead of the single injector 10 two separate injectors could be used for the chambers 1 and 2.

It is to be understood that various constructional modifications can be made in the conformation and arrangement of the various members of the embodiments which have been described by way of example without departing from the scope of the invention as defined in the appended claims.

I claim:

1. In an engine including a cylinder and a piston slidable therein, of the type in which liquid fuel is directly injected, a principal compartment, an auxiliary compartment, a passage connecting said compartments; a single multiple-jet injector arranged with its mouth located in the principal compartment, in the immediate proximity of the passage between the principal and auxiliary compartments, a partition partly closing said passage and arranged in immediate proximity of the principal compartment, an aperture in said partition for the passage of a fuel jet directed from the injector into the auxiliary compartment, at least one aperture in said partition for guiding the air penetrating, during the compressing stroke, into the auxiliary compartment so as to cause whirling turbulence in the latter, and at least one aperture in the partition for deflecting ignited gases, penetrating from the auxiliary into the principal compartment, from the mouth of the injector.

2. In an internal combustion engine including a cylinder and a piston slidable in the cylinder, of the type in which liquid fuel is directly injected, a principal combustion chamber, an auxiliary combustion chamber, means including an injector arranged in the principal chamber to supply to said chambers liquid fuel in proper proportion to the air volumes of the chambers, a perforated part forming a common partition for said two chambers, a passage connecting the principal chamber with the cylinder, this passage being substantially larger than the passage formed by the perforations in said perforated part and so arranged that the compression during the upward movement of the piston causes at the most a very slight turbulence in the principal chamber, at least one aperture in said perforated part for directing the air penetrating in the auxiliary chamber during compression so as to cause whirling turbulence therein, and at least one further aperture in said perforated part for deflecting ignited gases penetrating from the auxiliary chamber into the principal chamber, during combustion from the mouth of the injector arranged in the latter chamber.

3. In an internal combustion engine, including a cylinder and a piston slidable in the cylinder, of the type in which fuel is directly injected, a principal combustion chamber communicating with the cylinder through a relatively large opening, an auxiliary combustion chamber having a substantially circular wall, a passageway communicating with the auxiliary chamber and arranged substantially tangentially to said wall, first and second relatively restricted port means placing said passageway in communication with the principal combustion chamber, said large opening being so aranged that the compression during the compression stroke of the piston causes at the most a very slight turbulence in the principal combustion chamber, a rib dividing the principal chamber into two communicating compartments and arranged in alignment with said passageway for directing ignited gases from the auxiliary chamber after ignition, into the compartments of the principal chamber so as to cause whirling turbulence in said compartments, and a single injector extending into the principal chamber in immediate proximity to said first port means for injecting separate jets respectively through the first port means into the auxiliary chamber and into the two compartments of the principal chamber.

4. In an engine according to claim 3, a single multiple-jet injector arranged in the principal combustion compartment in immediate proximity of the passage connecting the principal and auxiliary compartments, for injecting separate liquid fuel jets in the different compartments, and means for deflecting from the mouth of the injector most of the ignited gases penetrating after ignition from the auxiliary into the principal compartment.

5. In an engine according to claim 3, a partition partly closing the passage between the auxiliary and principal compartments, in immediate proximity of the principal compartment, at least one aperture in the partition for directing the air penetrating during compression into the auxiliary compartment to cause whirling turbulence therein, and for deflecting ignited gases penetrating during combustion from the auxiliary into the principal compartment from the mouth of the injector arranged therein and causing whirling turbulence in the principal compartment.

EMILE MICHEL WEBER.